(12) United States Patent
Lairsey et al.

(10) Patent No.: US 11,290,557 B2
(45) Date of Patent: Mar. 29, 2022

(54) SYSTEMS AND METHODS FOR PROXYING SERVICES BETWEEN A MODULAR INFORMATION HANDLING SYSTEM AND A MOBILE DEVICE

(71) Applicant: Dell Products L.P., Round Rock, TX (US)

(72) Inventors: Jeff M. Lairsey, Round Rock, TX (US); Sudhir Vittal Shetty, Cedar Park, TX (US); Arulnambi Raju, Round Rock, TX (US); My Tran, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 15/909,046

(22) Filed: Mar. 1, 2018

(65) Prior Publication Data

US 2019/0273798 A1 Sep. 5, 2019

(51) Int. Cl.
*G06F 15/16* (2006.01)
*H04L 67/566* (2022.01)
*H04L 67/10* (2022.01)
*G06F 16/951* (2019.01)

(52) U.S. Cl.
CPC ........ *H04L 67/2833* (2013.01); *G06F 16/951* (2019.01); *H04L 67/10* (2013.01)

(58) Field of Classification Search
CPC .... H04L 67/2833; H04L 67/10; G06F 16/951
USPC ........................................................ 709/223
See application file for complete search history.

(56) References Cited

U.S. PATENT DOCUMENTS

| | | | |
|---|---|---|---|
| 2006/0133414 A1* | 6/2006 | Luoma | H04L 67/16 370/466 |
| 2011/0029693 A1* | 2/2011 | Brinkmann | G06F 13/4081 710/8 |
| 2014/0152423 A1* | 6/2014 | Petel | H04W 52/0229 340/5.72 |

(Continued)

OTHER PUBLICATIONS

C. Yoon, H. Choi, J. Cho and Y. W. Kim, "CoAP over BLE-GATT for OCF," 2017 International Conference on Information and Communication Technology Convergence (ICTC), 2017, pp. 32-34.*

(Continued)

*Primary Examiner* — Melvin H Pollack
*Assistant Examiner* — Messeret F Gebre
(74) *Attorney, Agent, or Firm* — Jackson Walker L.L.P.

(57) ABSTRACT

In accordance with embodiments of the present disclosure, an information handling system may include a plurality of slots, each slot of the plurality of slots configured to receive a computing node, a wireless communication interface, and a management controller communicatively coupled to the slots, communicatively coupled to the wireless communication interface, and configured to provide management of the information handling system. The management controller may be further configured to execute an aggregator service, wherein the aggregator service exposes a plurality of proxy attributes through which a client mobile device external to the information handling system and configured to manage the information handling system via the wireless communication interface accesses services and attributes of the information handling system.

18 Claims, 3 Drawing Sheets

(56) References Cited

U.S. PATENT DOCUMENTS

| | | | | |
|---|---|---|---|---|
| 2014/0337405 | A1* | 11/2014 | Athas | H04L 67/26 |
| | | | | 709/203 |
| 2016/0173624 | A1* | 6/2016 | Lee | H04L 67/16 |
| | | | | 455/456.3 |
| 2016/0315805 | A1* | 10/2016 | Ragupathi | H05K 7/1498 |
| 2017/0013062 | A1* | 1/2017 | Kim | H04L 67/125 |
| 2017/0289277 | A1* | 10/2017 | Lee | H04W 84/18 |

OTHER PUBLICATIONS

Horvat, I., Lukac, N., Pavlovic, R., & Starcevic, D. (2015). Smart plug solution based on bluetooth low energy doi:http://dx.doi.org/10.1109/ICCE-Berlin.2015.7391301.*

Y. Ting and F. J. Lin, "A comparison and evaluation of different BLE connection methods for wearable devices," 2017 IEEE Conference on Standards for Communications and Networking (CSCN), 2017, pp. 240-245.*

B. Yu, L. Xu and Y. Li, "Bluetooth Low Energy (BLE) based mobile electrocardiogram monitoring system," 2012 IEEE International Conference on Information and Automation, 2012, pp. 763-767.*

* cited by examiner

_(1)_
SYSTEMS AND METHODS FOR PROXYING SERVICES BETWEEN A MODULAR INFORMATION HANDLING SYSTEM AND A MOBILE DEVICE

TECHNICAL FIELD

The present disclosure relates in general to information handling systems, and more particularly to systems and methods for providing communications access by a mobile device to multiple modular nodes of an information handling system via a wireless communications interface.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many information handling system designs, some information handling systems include an interface such as a near-field communication interface (e.g., Bluetooth) for permitting access to a management controller of the information handling system by another information handling system external to the first information handling system. For example, in existing information handling systems, once a connection is established between an information handling system and a mobile device external to the information handling system via Bluetooth (e.g., Bluetooth Low Energy), Bluetooth may implement a generic attribute (GATT) profile on the information handling system that defines a hierarchical data structure that is exposed to Bluetooth devices coupled to the information handling system.

GATT profiles describe use case, roles, and general behaviors. Services are collections of characteristics and relationships to other services that encapsulate the behavior of a device, and may include a hierarchy of characteristics of a device or an information handling system, wherein such characteristics encapsulate attributes of a device.

The top level of the hierarchy is a profile, which is composed of one or more services necessary to fulfill a use case. A service is composed of information available to a user, and may include characteristics of references to other services. A characteristic comprises of a type (represented by a universal unique identifier or "UUID"), a value, a set of properties indicating the operations the characteristic supports, and a set of permissions relating to security. It may also include one or more descriptors—metadata or configuration flags relating to the owning characteristic.

GATT groups these services to encapsulate the behavior of part of a device, and describes a use case, roles, and general behaviors based on the GATT functionality. The framework defines procedures and formats of services and their characteristics, including discovering, reading, writing, notifying, and indicating characteristics, as well as configuring the broadcast of characteristics.

In monolithic systems, a GATT profile may be defined on a management controller (e.g., Integrated Dell Remote Access Controller or "iDRAC") which is enumerated to the client mobile device during an initial handshake. The mobile device reads this profile and uses it to access the services and characteristics offered by the management controller during the Bluetooth session. Due to the static intention of the GATT profile, the profile is only read once and is cached by the client mobile device for efficiency. Client mobile devices may have a limitation on the number of GATT profile services and characteristics allowed.

Accordingly, the GATT profile presents a number of disadvantages. For example, in an information handling system such as an enterprise modular server, a large number of GATT services and attributes may be needed to expose the system inventories and sensor values of attached components (compute nodes, storage, input/output modules, power supply units, etc.). However, as noted above, client mobile devices may have a limit to the number of GATT attributes and services they can access.

As another example, the existing solution in Bluetooth to provide notification of a dynamic change to a service requires re-enumeration of all services and attributes in order to obtain handles at the client mobile device. The re-enumeration of a large amount of services and characteristics may be undesirably time consuming.

SUMMARY

In accordance with the teachings of the present disclosure, the disadvantages and problems associated with provision of communication access to many management controllers may be reduced or eliminated.

In accordance with embodiments of the present disclosure, an information handling system may include a plurality of slots, each slot of the plurality of slots configured to receive a computing node, a wireless communication interface, and a management controller communicatively coupled to the slots, communicatively coupled to the wireless communication interface, and configured to provide management of the information handling system. The management controller may be further configured to execute an aggregator service, wherein the aggregator service exposes a plurality of proxy attributes through which a client mobile device external to the information handling system and configured to manage the information handling system via the wireless communication interface accesses services and attributes of the information handling system.

In accordance with these and other embodiments of the present disclosure, a method may be provided for use in an information handling system comprising a plurality of slots wherein each slot of the plurality of slots is configured to receive a computing node and a wireless communication interface controller communicatively coupled to the slots. The method may include executing an aggregator service, wherein the aggregator service exposes a plurality of proxy attributes through which a client mobile device external to the information handling system and configured to manage the information handling system via the wireless communication interface accesses services and attributes of the information handling system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a plurality of slots wherein each slot of the plurality of slots is configured to receive a computing node and a wireless communication interface controller communicatively coupled to the slots execute an aggregator service, wherein the aggregator service exposes a plurality of proxy attributes through which a client mobile device external to the information handling system and configured to manage the information handling system via the wireless communication interface accesses services and attributes of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
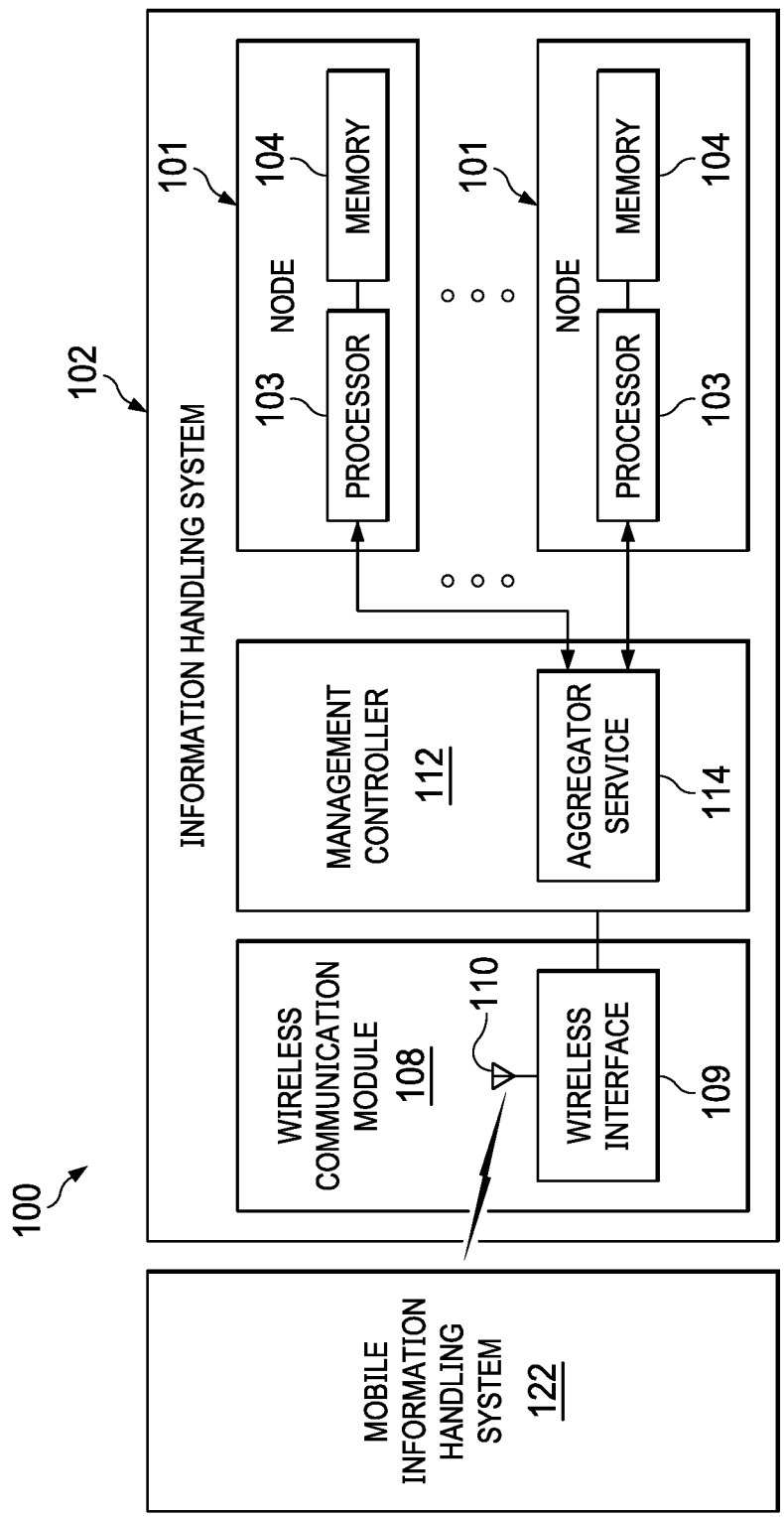
FIG. 1 illustrates a system for host system management of an information handling system via a mobile device, in accordance with embodiments of the present disclosure.
Figure 2:
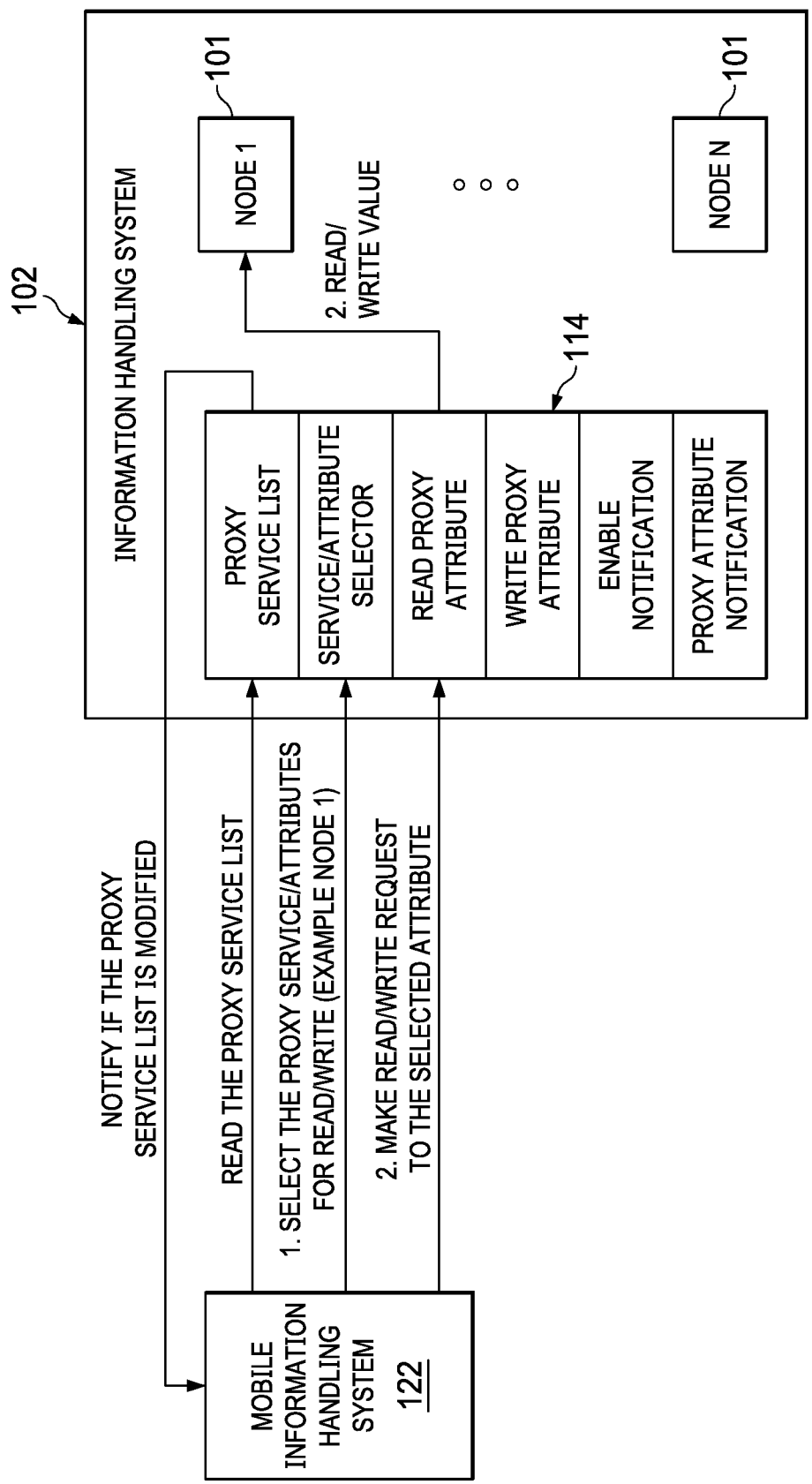
FIG. 2 illustrates an example of a proxy attribute read/write sequence, in accordance with embodiments of the present disclosure.
Figure 3:
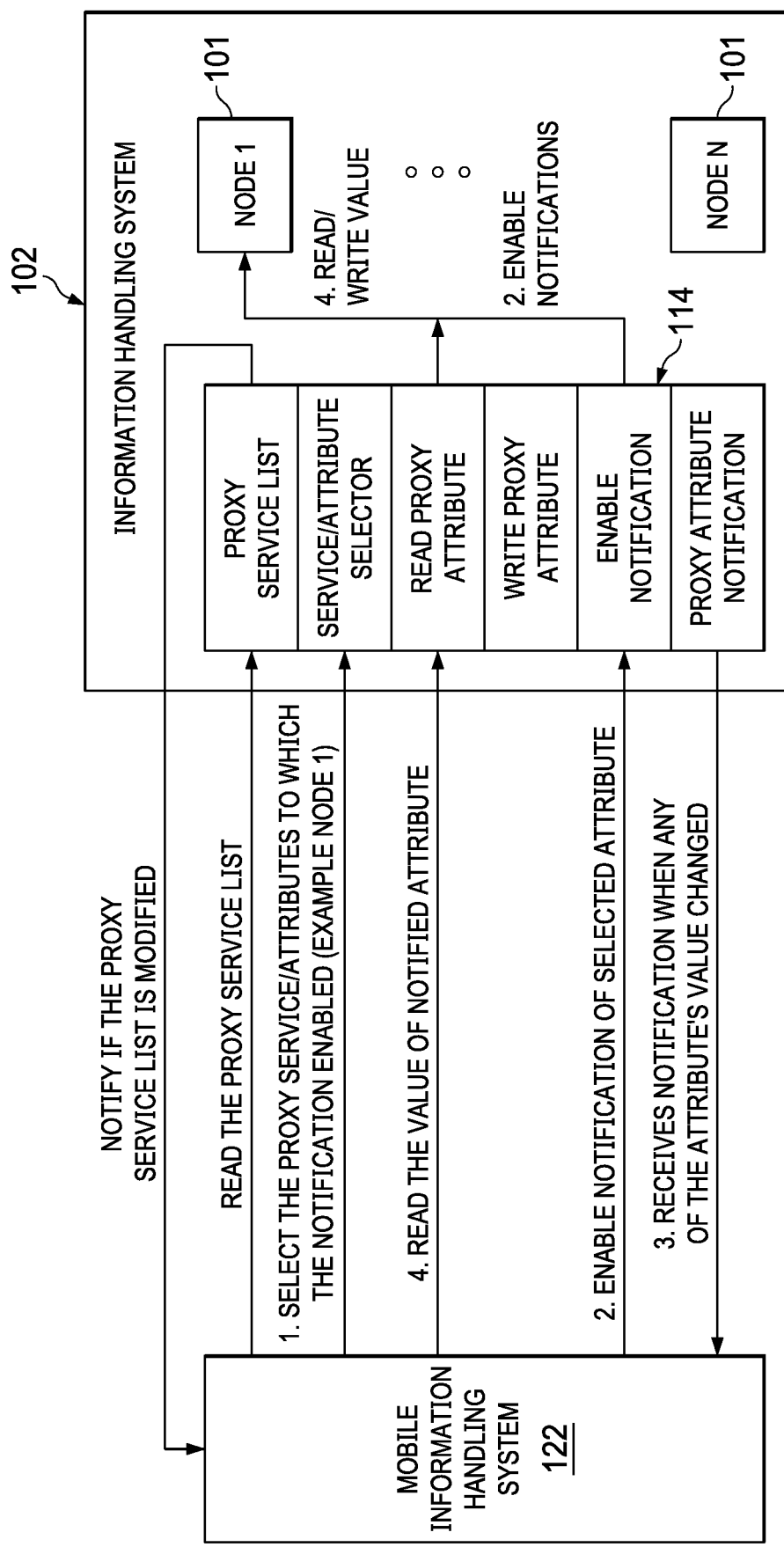
FIG. 3 illustrates an example of a proxy attribute notification sequence, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, Wifi, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, near field communication (NFC), radio frequency identification (RFID), proximity card, vicinity card, ISO 14443, WiFi, and ISO 15693.

FIG. 1 illustrates a system 100 for host system management of an information handling system via a mobile device, in accordance with embodiments of the present disclosure. As shown in FIG. 1, system 100 may include information handling system 102 and a mobile information handling system 122.

In some embodiments, information handling system 102 may comprise a modular server comprising a plurality of slots in which to receive a plurality of modular nodes 101, as shown in FIG. 1. In other embodiments, information handling system 102 may comprise networking equipment for facilitating communication over a communication network. In yet other embodiments, information handling system 102 may comprise a personal computer, such as a laptop, notebook, or desktop computer. For purposes of exposition, information handling system 102 nodes 101 are shown with only a very small portion of their components.

Each node 101 may represent a modular compute node, and may comprise a sled or other modular form factor that may be readily inserted into or removed from (e.g., "hot plugged") a corresponding slot of information handling system 102. Thus, each node 101 may operate a host computing system. As shown in FIG. 1, each node 101 may include, among other components, a processor 103 and a memory 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, a storage resource, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

In addition to a processor 103 and a memory 104, a node 101 may include one or more other information handling resources.

In addition to nodes 101, information handling system 102 may also include a management controller 112 and a wireless communication module 108.

Management controller 112 may be communicatively coupled to the various processors 103 of nodes 101 inserted into information handling system 102 and may comprise any system, device, or apparatus configured to facilitate management and/or control of nodes 101, information handling system 102, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102, thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), Dell Remote Management controller (DRAC) or an Integrated Dell Remote Management controller (iDRAC). In these and other embodiments, management controller 112 may also be referred to as an access controller or a life-cycle controller.

As shown in FIG. 1, management controller 112 may implement an aggregator service 114. Aggregator service 114 may comprise a program of instructions which is executable by management controller 112 (e.g., by a processor of management controller 112), and when executed, is configured to perform aggregation of services (e.g., Bluetooth services) of nodes 101 and/or other information handling resources of information handling system 102 for communication with a client external to information handling system 102 (e.g., mobile information handling system 122), as described in greater detail below.

Wireless communication module 108 may be communicatively coupled to management controller 112 and may comprise any suitable system, apparatus, or device operable to serve as an interface between management controller 112 and another information handling system and/or a network. As shown in FIG. 1, wireless communication module 108 may comprise a wireless interface 109 communicatively coupled to management controller 112 and an antenna 110. Wireless interface 109 may enable information handling system 102 to communicate using any suitable transmission protocol and/or standard. In some embodiments, wireless interface 109 may be configured to communicate with another information handling system (e.g., a tablet, notebook, hand-held computer, mobile telephony device, etc.) via wireless transmissions, thus allowing a user of such other information handling system to perform management operations on management controller 112 via such other information handling system and wireless interface 109. In particular embodiments, wireless interface 109 may be configured to communicate with another information handling system via a short-range wireless communications technology. In these and other embodiments, wireless interface 109 may comprise a network interface card, or "NIC."

Antenna 110 may be communicatively coupled to wireless interface 109, and may comprise any system, device, or apparatus configured to convert electric power into radio waves, and vice versa.

Mobile information handling system 122 may comprise a tablet, notebook, hand-held computer, mobile telephony device, or other suitable highly-portable device, and may be configured to execute system management software for interfacing with and managing information handling system 102 via management controller 112. Mobile information handling system 122 may be configured with wireless communication features (e.g., Wi-Fi, BLUETOOTH, etc.) in order to communicate with management controller 112 via wireless communication module 108.

In addition to nodes 101, management controller 112, and wireless communication module 108, information handling system 102 may include one or more other information handling resources.

As mentioned above, in operation, aggregator service 114 may be configured to perform aggregation of services (e.g., Bluetooth services) of nodes 101 and/or other information handling resources of information handling system 102 for communication with mobile information handling system 122. Through aggregator service 114, mobile information handling system 122, serving as a client, may detect and access unlimited Bluetooth services of information handling system 102. In addition, aggregator service 114 may ease the access of dynamically inserted components' services without requiring client-side re-enumeration.

Aggregator service 114 may expose a plurality (e.g., six) attributes through which client mobile information handling system 122 may access all other proxy Bluetooth services. In addition, aggregator service 114 may allow management controller 112 to communicate asynchronously to the client through a notify attribute.

The table below sets forth example attributes of aggregator service 114, in accordance with embodiments of the present disclosure:

| Proxy Attribute Name | Description |
| --- | --- |
| Proxy service list | A read-only attribute (from perspective of mobile information handling system 122) that lists a UUID mapping of currently available services and attributes, which is kept up to date by management controller 112. |

-continued

| Proxy Attribute Name | Description |
| --- | --- |
| Service/attribute selector | A read/write attribute which mobile information handling system 122 may use to select the end service and attribute to which it will make a read/write request. The selection is made by writing a destination node identifier, service UUID, and attribute UUID to this attribute. |
| Read proxy attribute | Mobile information handling system 122 may read selected attributes through this proxy attribute. |
| Write proxy attribute | Mobile information handling system 122 may write selected attributes through this proxy attribute. |
| Enable notification of proxy service | A read/write attribute which allows mobile information handling system 122 to enable or disable the notification of a change to a particular service or attribute of information handling system 102. |
| Proxy attribute notification | This attribute may asynchronously notify mobile information handling system 122 of a change to a particular service or attribute of information handling system 102. |

To further illustrate functionality of aggregator service 114, FIG. 2 illustrates an example of a proxy attribute read/write sequence, in accordance with embodiments of the present disclosure, and FIG. 3 illustrates an example of a proxy attribute notification sequence, in accordance with embodiments of the present disclosure.

As shown in FIG. 2, mobile information handling system 122 may perform a proxy attribute read/write sequence by first selecting the services and/or attributes for the read or write action through the service/attribute selector attribute. Mobile information handling system 122 may select the services and/or attributes using identifiers set forth in the proxy service list that mobile information handling system 122 may obtain either by reading the proxy service list attribute and/or by notification from attribute aggregator 114 that the proxy service list attribute has been modified. After selecting the services and/or attributes for the read or write action, mobile information handling system 122 may perform a read action through the read proxy attribute or perform a write action through the write proxy attribute.

As shown in FIG. 3, mobile information handling system 122 may perform a proxy attribute notification sequence by first selecting the services and/or attributes to which a notification is to be enabled through the service/attribute selector attribute. Mobile information handling system 122 may select the services and/or attributes using identifiers set forth in the proxy service list that mobile information handling system 122 may obtain either by reading the proxy service list attribute and/or by notification from attribute aggregator 114 that the proxy service list attribute has been modified. After selecting the services and/or attributes for the proxy attribute notification sequence, mobile information handling system 122 may enable notification of the selected attributes and/or services through the enable notification of proxy service attribute. In response, the node 101 in question may respond through the proxy attribute notification attribute when any values of the selected attributes and/or services change. In response to receiving the notification, mobile information handling system 122 may read the changed attribute and/or service by performing a read action through the read proxy attribute.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a plurality of slots, each slot of the plurality of slots configured to receive a computing node;
    a wireless communication interface; and
    a management controller communicatively coupled to the slots, communicatively coupled to the wireless communication interface, and configured to provide management of the information handling system, the management controller further configured to execute an aggregator service that is configured to expose a plurality of Bluetooth proxy attributes comprising a first number of Bluetooth proxy attributes through which a client mobile device external to the information handling system and configured to manage the information handling system via the wireless communication interface is configured to access Bluetooth services and attributes of the information handling system comprising a second, larger number of Bluetooth services and attributes of the information handling system, wherein the aggregator service is configured to provide access to at least one service or attribute associated with a hot-inserted information handling resource of the information handling system without re-enumeration of services or attributes by the client mobile device, and wherein the Bluetooth proxy attributes are different from the Bluetooth services and attributes of the information handling system;
    wherein the plurality of proxy attributes comprises a proxy service list attribute which includes identifier mappings of available services and attributes of the information handling system, wherein the proxy service list attribute is writeable by the management controller and is read-only by the client mobile device.

2. The information handling system of claim 1, wherein the plurality of proxy attributes comprises a service/attribute selector proxy which is usable by the client mobile device to select a service or attribute to which the client mobile device will communicate a read request or a write request.

3. The information handling system of claim 1, wherein the plurality of proxy attributes comprises a read proxy attribute which is usable by the client mobile device to read a selected attribute or service.

4. The information handling system of claim 1, wherein the plurality of proxy attributes comprises a write proxy attribute which is usable by the client mobile device to write a selected attribute or service.

5. The information handling system of claim 1, wherein the plurality of proxy attributes comprises an enable notification of proxy service attribute which is usable by the client mobile device to enable or disable the notification of a change to a particular service or attribute of the information handling system.

6. The information handling system of claim 1, wherein the plurality of proxy attributes comprises a proxy attribute notification attribute which asynchronously notifies the client mobile device of a change to a particular service or attribute of the information handling system.

7. A method comprising:
    executing, by an information handling system, an aggregator service;
    wherein the information handling system includes a plurality of slots, wherein each slot of the plurality of slots is configured to receive a computing node, and wherein the information handling system includes a wireless communication interface controller communicatively coupled to the slots;
    exposing, by the aggregator service, a plurality of Bluetooth proxy attributes comprising a first number of Bluetooth proxy attributes through which a client mobile device external to the information handling system and configured to manage the information handling system via the wireless communication interface accesses Bluetooth services and attributes of the information handling system comprising a second, larger number of Bluetooth services and attributes of the information handling system, wherein the Bluetooth proxy attributes are different from the Bluetooth services and attributes of the information handling system; and
    providing, by the aggregator service, access to at least one service or attribute associated with a hot-inserted information handling resource of the information handling system without re-enumeration of services or attributes by the client mobile device;
    wherein the plurality of proxy attributes comprises a proxy service list attribute which includes identifier mappings of available services and attributes of the information handling system, wherein the proxy service list attribute is writeable by the management controller and is read-only by the client mobile device.

8. The method of claim 7, wherein the plurality of proxy attributes comprises a service/attribute selector proxy which is used by the client mobile device to select a service or attribute to which the client mobile device will communicate a read request or a write request.

9. The method of claim 7, wherein the plurality of proxy attributes comprises a read proxy attribute which is used by the client mobile device to read a selected attribute or service.

10. The method of claim 7, wherein the plurality of proxy attributes comprises a write proxy attribute which is used by the client mobile device to write a selected attribute or service.

11. The method of claim 7, wherein the plurality of proxy attributes comprises an enable notification of proxy service attribute which is used by the client mobile device to enable or disable the notification of a change to a particular service or attribute of the information handling system.

12. The method of claim 7, wherein the plurality of proxy attributes comprises a proxy attribute notification attribute which asynchronously notifies the client mobile device of a change to a particular service or attribute of the information handling system.

13. An article of manufacture comprising:
a non-transitory computer-readable medium; and
computer-executable instructions carried on the computer-readable medium, the instructions readable by a processor of an information handling system, the instructions, when read and executed, for causing the processor to:
execute an aggregator service;
wherein the information handling system includes a plurality of slots, wherein each slot of the plurality of slots is configured to receive a computing node, and wherein the information handling system further includes a wireless communication interface controller communicatively coupled to the slots; and
wherein the aggregator service is configured to expose a plurality of Bluetooth proxy attributes comprising a first number of Bluetooth proxy attributes through which a client mobile device external to the information handling system and configured to manage the information handling system via the wireless communication interface is configured to access Bluetooth services and attributes of the information handling system comprising a second, larger number of Bluetooth services and attributes of the information handling system, wherein the aggregator service is configured to provide access to at least one service or attribute associated with a hot-inserted information handling resource of the information handling system without re-enumeration of services or attributes by the client mobile device, and wherein the Bluetooth proxy attributes are different from the Bluetooth services and attributes of the information handling system;
wherein the plurality of proxy attributes comprises a proxy service list attribute which includes identifier mappings of available services and attributes of the information handling system, wherein the proxy service list attribute is writeable by the management controller and is read-only by the client mobile device.

14. The article of claim 13, wherein the plurality of proxy attributes comprises a service/attribute selector proxy which is usable by the client mobile device to select a service or attribute to which the client mobile device will communicate a read request or a write request.

15. The article of claim 13, wherein the plurality of proxy attributes comprises a read proxy attribute which is usable by the client mobile device to read a selected attribute or service.

16. The article of claim 13, wherein the plurality of proxy attributes comprises a write proxy attribute which is usable by the client mobile device to write a selected attribute or service.

17. The article of claim 13, wherein the plurality of proxy attributes comprises an enable notification of proxy service attribute which is usable by the client mobile device to enable or disable the notification of a change to a particular service or attribute of the information handling system.

18. The article of claim 13, wherein the plurality of proxy attributes comprises a proxy attribute notification attribute which asynchronously notifies the client mobile device of a change to a particular service or attribute of the information handling system.

\* \* \* \* \*